United States Patent Office 3,761,462
Patented Sept. 25, 1973

3,761,462
QUATERNARY AZO DYESTUFFS FROM SUBSTITUTED BENZISOTHIAZOLES AND AMMONIUM CONTAINING AROMATIC CARBOCYCLIC COUPLERS
Karl-Ludwig Moritz, Cologne-Stammheim, and Carl Taube, Leverkusen, Germany, assignors to Bayer Aktiengesellschaft, Leverkusen, Germany
No Drawing. Continuation of abandoned application Ser. No. 673,280, Oct. 6, 1967. This application Dec. 22, 1970, Ser. No. 100,799
Claims priority, application Germany, Oct. 15, 1966, F 50,454
Int. Cl. C09b 29/08; D06p 1/08
U.S. Cl. 260—158                    9 Claims

ABSTRACT OF THE DISCLOSURE

Azo dyestuffs free of sulphonic acid and carboxylic acid groups of the formula

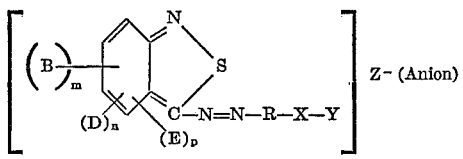

wherein B, D and E stand for substituents, R stands for an aromatic carbocyclic radical, X stands for a bridge and Y stands for an ammonium group, and m, n and p are 0 or 1. These dyestuffs are eminently suited for dyeing and printing tanned cotton, fibers of aromatic polyesters, especially those containing sulphonic acid groups such as ethylene glycol and sulphophthalic acid, polyamide fibers, polyurethane fibers, polyacrylonitrile fibers, dicyanoethylene fibers. The dyeings are characterized by superior fastness properties, especially to light and wet processing, as well as ironing, sublimiation and decatizing.

---

This application is a continuation of our prior application Ser. No. 673,280, filed Oct. 6, 1967, and now abandoned.

The present invention relates to valuable new azo dyestuffs which are free from sulphonic acid and carboxylic acid groups and correspond to the formula

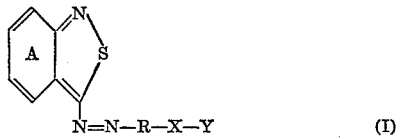    (I)

In this formula R denotes an aromatic-carbocyclic radical, X is a bridge member, Y is an ammonium group; the ring A as well as the radicals R, X and Y may contain further substituents with the exception of sulphonic acid and carboxylic acid groups.

The new dyestuffs of the Formula I are obtained by combining a diazotised 3-amino-2,1-benzisothiazole with an azo component of the formula

H—R—X—Y    (II)

in which R, X and Y have the same meaning as above, choosing starting components which are free from sulphonic acid and carboxylic acid groups.

As 3-amino-2,1-benzisothiazoles which are suitable for the reaction and correspond to the formula

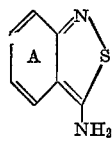    (III)

in which the ring A may contain further substituents with the exception of sulphonic acid and carboxylic acid groups, there may be used, besides unsubstituted 3-amino-2,1-benzisothiazole, for example, those derivatives which contain the following substituents in the ring A: chlorine, bromine; alkyl groups with 1–12 carbon atoms, preferably those with 1–4 carbon atoms, such as, e.g. methyl, ethyl, propyl, isopropyl or butyl groups; substituted alkyl groups with 1–12 carbon atoms containing as substituents, for example, halogen, especially chlorine and bromine, hydroxyl, cyano, acyl, acyloxy, alkoxy, alkoxycarbonyl, alkoxycarbonyloxy groups, primary or secondary aliphatic amino groups, acylamino groups, such as e.g. acetylamino groups, propionylamino groups, alkoxycarbonylamino groups alkylsulphonylamino groups, or arylsulphonylamino groups; alkylsulphonyl, arylsulphonyl and sulphonylamino groups; further aralkyl, aryl, cyano, thiocyano, nitro, nitroso, amino groups; amino groups substituted by alkyl or aryl groups acyl, alkoxycarbonyl, alkylsulphonyl, arylsulphonyl or carbonamide groups; acyl, acyloxy, alkoxycarbonyl, hydroxy, alkoxy, alkoxycarbonyloxy, aryloxy, sulphonamide, alkylsulphonyl, arylsulphonyl, alkylthio and arylthio groups; the alkyl and aryl groups may be further substituted in any way except by sulphonic acid and carboxylic acid groups. Examples of such compounds are:

3-amino-2,1-benzisothiazole,
3-amino-5-methyl-2,1-benzisothiazole,
3-amino-4-ethyl-2,1-benzisothiazole,
3-amino-4,7-dimethyl-2,1-benzisothiazole,
3-amino-4-methoxy-2,1-benzisothiazole,
3-amino-7-chloro-2,1-benzisothiazole,
3-amino-6-chloro-2,1-benzisothiazole,
3-amino-5-chloro-2,1-benzisothiazole,
3-amino-5,7-dichloro-2,1-benzisothiazole,
3-amino-7-bromo-2,1-benzisothiazole,
3-amino-6-bromo-2,1-benzisothiazole,
3-amino-5-bromo-2,1-benzisothiazole,
3-amino-4-bromo-2,1-benzisothiazole,
3-amino-5,7-dibromo-2,1-benzisothiazole,
3-amino-6-cyano-2,1-benzisothiazole,
3-amino-4,6-dichloro-5-cyano-2,1-benzisothiazole,
3-amino-7-chloro-5-cyano-2,1-benzisothiazole,
3-amino-5-chloro-7-cyano-2,1-benzisothiazole,
3-amino-4-methyl-6-cyano-2,1-benzisothiazole,
3-amino-7-nitro-2,1-benzisothiazole,
3-amino-6-nitro-2,1-benzisothiazole,
3-amino-5-nitro-2,1-benzisothiazole,
3-amino-4-nitro-2,1-benzisothiazole,
3-amino-5,7-dinitro-2,1-benzisothiazole,
3-amino-5-nitro-7-chloro-2,1-benzisothiazole,
3-amino-5-nitro-7-bromo-2,1-benzisothiazole,
3-amino-5-(N-methylsulphonamido)-2,1-benzisothiazole,
3-amino-5-(N,N-dimethylsulphonamido)-2,1-benzisothiazole,
3-amino-5-methylsulphonyl-2,1-benzisothiazole.

Diazotisation of the aminobenzisothiazoles is preferably carried out in concentrated sulphuric acid, acetic acid/propionic acid mixture or phosphoric acid at temperatures from 0 to −10° C.

Suitable coupling components of the Formula II are, for example, aminobenzene derivatives of the general formula

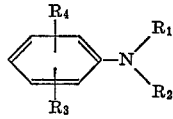    (IV)

in which $R_1$ and $R_2$ stand for hydrogen an alkyl group with 1–12 carbon atoms which may be substituted by halogen, especially chlorine and bromine, cyano, hydroxyl, acyl, acyloxy, alkoxy, alkoxycarbonyl, alkoxycarbonyloxy, amino or ammonium groups or by acylamino radicals, especially acetylamino, propionylamino, alkoxycarbonylamino, alkylsulphonylamino or arylsulphonylamino radicals; an aralkyl group, an optionally substituted aryl group, an acyl group, such as an alkoxycarbonyl group; and $R_3$ denotes hydrogen or a substituent, especially halogen, such as chlorine or bromine; an alkyl group with 1–12 carbon atoms; an alkyl group substituted by amino or ammonium groups or acylamino groups, such as, e.g. acetylamino, propionylamino, alkoxycarbonylamino, alkylsulphonylamino or arylsulphonylamino groups; a cyano group, an alkoxy group with 1–12 carbon atoms, an acyloxy, alkoxycarbonyl, an amino monoalkylamino or dialkylamino group (alkyl may be substituted), or an acylamino group, especially an acetylamino, propionylamino, alkoxycarbonylamino, alkylsulphonylamino or arylsulphonylamino group as well as an urea group or an ammoniumacrylamino group, such as

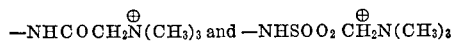

or an ammonium-alkylene-amino group; and $R_4$ stands for hydrogen, an alkyl, alkoxy or an amino, alkylamino or acylamino group of the above type, with the proviso that at least one of the radicals $R_1$, $R_2$ (with the inclusion of —N—) or $R_3$ corresponds to the definition —X—Y.

Preferred coupling components of the Formula IV are those aminobenzene derivatives which carry on the aniline nitrogen atom a $\beta$-ammonium-alkylene grouping the alkylene radical of which contains 2 to 3 carbon atoms.

Furthermore, those coupling components should be specially mentioned, which contain a quaternary ammonium group and are obtained by condensing aminobenzene derivatives of the formula

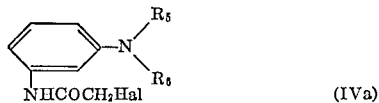

in which $R_5$ and $R_6$ denote hydrogen, alkyl groups with 1–4 carbon atoms, which may be substituted by halogen, cyano, hydroxyl, acyl, alkoxy, or alkoxycarbonyloxy, or denote aralkyl groups, and $R_5$ and $R_6$ may also be fused to form a ring, with tertiary aliphatic, cycloaliphatic or heterocyclic amines, such as trialkylamines, trihydroxyalkylamines, N-alkylpyrrolidines, N-alkyl-piperadines, N-alkylmorpholines, quinuclidine, pyridine, alkyl-pyridines or quinoline. The reaction takes place on the ω-haloacylamino group in the m-position to the group

with the splitting off of hydrogen halide.

Examples of aminobenzene derivatives of the Formula IV are the quaternisation products of the following amino compounds, as are for example obtained by quaternisation with esters of strong mineral acids and organic sulphonic acids of preferably low-molecular alcohols, such as alkyl halides, aralkyl halides, dialkyl sulphates, and esters of sulphonic acids of the benzene series, such as the methyl, ethyl, propyl and n-butyl esters of benzene-sulphonic acids of preferably low-molecular alcohols, such sulphonic acid:

1-N-(dimethylamino-ethyl)-amino-benzene,
1-N-(diethylamino-ethyl)-amino-benzene,
1-N-(dimethylamino-ethyl)-amino-3-methyl-benzene,
1-N-(dimethylamino-ethyl)-amino-3-chloro-benzene,
1-N-(dimethylamino-ethyl)-amino-3-acetylamino-benzene,
1-N-(diethylamino-ethyl)-amino-3-methyl-benzene,
1-N-(dimethylamino-ethyl)-N-methylamino-3-methyl-benzene,
1-N-(dimethylamino-ethyl)-N-ethylamino-3-methyl-benzene,
1-N-(dimethylamino-ethyl)-N-butylamino-3-methyl-benzene,
1-N-(dimethylamino-ethyl)-N-benzylamino-3-methyl-benzene,
1-N-(dimethylamino-propyl)-N-benzylamino-3-methyl-benzene,
1-N-(dimethylamino-ethyl)-N-methylamino-3-chloro-benzene,
1-N-(dimethylamino-ethyl)-N-butylamino-benzene,
1-N-(dimethylaminoethyl)-N-ethylamino-benzene,
1-N-(diethylaminoethyl)-N-ethylamino-3-methyl-benzene,
1-N-(dimethylamino-ethyl)-N-$\beta$-hydroxyethylamino-3-methyl-benzene,
1-N-(dimethylamino-ethyl)-N-$\beta$-cyanoethylamino-3-methyl-benzene,
1-N-(dimethylamino-ethyl)-N-ethylamino-2-methoxy-5-methyl-benzene,
1-N-(dimethylamino-ethyl)-amino-2-methoxy-5-methyl-benzene,
1-N-(dimethylamino-ethyl)-amino-2,5-dimethoxy-benzene,
1-N-(dimethylamino-ethyl)-N-ethyl-amino-2,5-dimethoxy-benzene,
1-N-(di-$\beta$-hydroxyethylamino-ethyl)-N-methylamino-benzene,
1-N-(di-$\beta$-hydroxyethylamino-ethyl)-N-ethyl-amino-3-methyl-benzene,
1-N-($\beta$-pyrrolidino-ethyl)-N-ethylamino-3-methyl-benzene,
1-N-($\beta$-piperidino-ethyl)-N-ethylamino-3-methyl-benzene,
1-N-($\beta$-piperidino-ethyl)-N-butylamino-3-methyl-benzene,
1-N-($\beta$-morpholino-ethyl)-N-ethylamino-3-methyl-benzene,
1-N-(dimethylamino-propyl)-N-$\beta$-hydroxyethylamino-benzene,
1-N-(dimethylamino-propyl)-N-$\beta$-hydroxyethylamino-3-methyl-benzene,
1-N-(diethylamino-propyl)-N-$\beta$-cyanoethylamino-3-methyl-benzene,
4-[$\beta$-dimethylamino-ethyl)-amino]-diphenylamine,
N-($\beta$-diethylamino-ethyl)-diphenylamine,
4-[(dimethylamino-acetyl)-amino]-diphenylamine,
1-N,N-dimethylamino-3-N'-dimethylamino-acetyl-aminobenzene,
1-N,N-diethylamino-3-N'-dimethylamino-acetyl-aminobenzene,
1-N,N-dimethylamino-3-N'-$\beta$-dimethylamino-propionyl-aminobenzene.

In the aforesaid coupling components the bridge members X of the compound of the Formula II are generally alkylene-amino or acylamino groups. These bridge members are preferred in the products obtainable according to the present process and in the starting compounds required for this purpose. Among the alkylene radicals, branched, or, preferably, unbranched alkylene groups with 2–3 carbon atoms are of outstanding interest. Among the acylamino groupings which are also preferred, those of the aliphatic series should be specially mentioned, such as acetylamino, propionylamino and butyrylamino. In general, those bridge members X are of particular interest, which correspond to the general formula

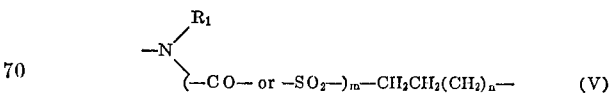

in which $R_1$ has the same meaning as above, $m$ is the number 0 or 1, and $n$ stands for the number 0 or 1, as well as the derivatives further substituted in the alkylene chain —$CH_2CH_2(CH_2)_n$— by alkyl radicals.

In the form of the quaternary ammonium group, the ammonium group Y linked with the bridge member X may contain any substituents, preferably aliphatic or aromatic substituents; alkyl groups which contain 2–5 carbon atoms and may be substituted by halogen, cyano, hydroxyl, acyl, alkoxy, alkoxycarbonyl, alkoxycarbonyloxy, aralkyl and aryl groups are of particular importance. In the quaternary ammonium groups two alkyl groups may be fused to form a heterocyclic ring which may contain further hetero atoms. The quaternary ammonium group may also contain, as one of the substituents, an amino group which, in turn, may be further substituted (hydrazonium group).

Coupling of the starting components is carried out in the usual manner in an aqueous acid, such as phosphoric, acetic or sulphuric acid or acetic acid/propionic acid, solution or dispersion.

Especially preferred dyestuffs within the scope of the general Formula I correspond to the formula

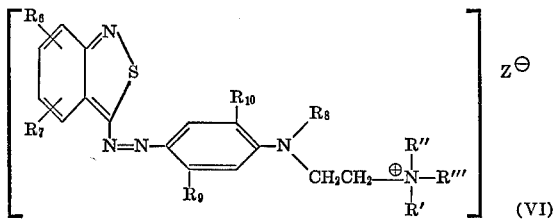

(VI)

in which $R_6$ and $R_7$, independently of one another, denote hydrogen or $Cl^-$, $Br^-$, alkylsulphonyl, nitro, lower alkyl or lower alkoxy radicals, $R_9$ denotes hydrogen, Cl, $CH_3$, a lower alkoxy radical or an acylamino group, $R_{10}$ is hydrogen or a lower alkoxy group, $R_8$ is hydrogen or a lower alkyl radical which may be further substituted, but not by sulphonic acid and carboxylic acid groups, $R'$ is a lower alkyl group or a group $NH_2$ which may be further substituted, but not by sulphonic acid or carboxylic acid groups, $R''$ and $R'''$, independently of one another, denote lower alkyl groups which may be further substituted, but not with sulphonic acid and carboxylic acid groups, and Z is the radical of an anion.

Dyestuffs of the Formula VI can be obtained by coupling suitable diazotised 3-amino-benzisothiazoles with azo components of the formula

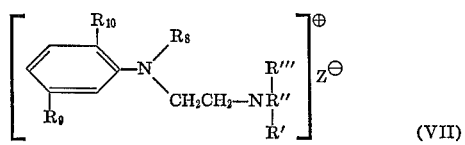

(VII)

in which $R_8$, $R_9$ and $R_{10}$, $R'$, $R''$ and $R'''$ and Z have the same meaning as above.

The new dyestuffs of the Formulae I and VI are present in the form of a salt which may contain any anions as anionic radical Z, preferably uncoloured anions, such as $Cl^-$, $Br^-$, sulphonate groups, such as $-OSO-_3CH_3^-$, $-OSO_3C_2H_5^-$, paratoluene-sulphonate, benzene-sulphonate, $[BF_4]^-$, phosphate, acetate, $ZnCl_3^-$, perchlorate, $NO_3^-$, sulphate, oxalate, formate, citrate, maleinate, tartrate, benzoate, lactate, propionate, butyrate or succinate radicals.

The nature of the preferably uncoloured anion is generally not important for the dyeing properties of the dyestuff. Moreover, the anions can easily be interchanged by converting the dyestuffs which are present in form of the salt, with alkalies into the free bases and reconverting these into dyestuff salts by means of other organic or inorganic acids.

The 3-amino-2,1-benzisothiazoles of the general Formula III used as diazo components can be obtained according to the reaction scheme given below in the manner described in Journal of Medicinal Chemistry 8 (1965), No. 4, p. 15 and in Journal of Organic Chemistry 24 (1959), p. 272, by the reaction of substituted o-aminobenzonitriles of the general Formula VIII with hydrogen sulphide or ammonium hydrogen sulphide to form the o-aminoaryl-carboxylic acid thioamides of the Formula IX, followed by dehydrogenating ring closure.

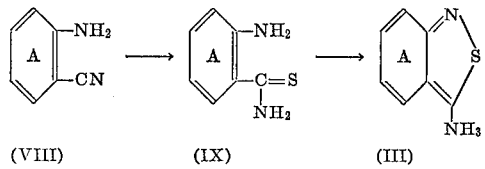

(VIII)    (IX)    (III)

The o-amino-benzonitriles of the general Formula VIII are easily obtainable by the elimination of water from the corresponding o-amino-benzoic acid amides, by the reduction of o-nitro-cyanobenzenes, by the introduction of a cyano group into o-nitro-chlorobenzenes or o-nitrophenols by nucleophilic exchange and subsequent reduction of the nitro group, and by electrophilic substitution of o-aminobenzonitriles or by chlorination, bromination or nitration.

Such dyestuffs are azo dyestuffs free of sulfonic acid and carboxylic acid groups having the formula

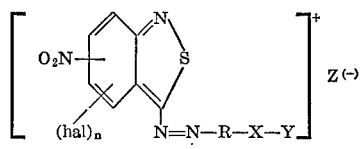

wherein hal is chlorine or bromine
$n$ is 0 or 1
Z is an anion
R is p-phenylene; p-phenylene substituted by one or more members Cl, lower alkyl, lower alkoxy, or acylamino, wherein acyl is acetyl, propionyl, or dimethylamino propionyl; di-lower alkylamino substituted o-phenylene; diphenylamino -ylene -4,4'; or dilower alkylamino, lower alkoxy substituted o-phenylene;
X is the bridge member

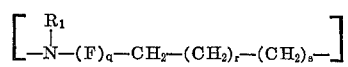

wherein
$q$, $r$, and S are 0 or 1
F is CO or $SO_2$
$R_1$ is H, benzyl, alkyl with 1–12 carbon atoms, alkyl with 1–12 carbon atoms substituted by a member Cl, Br, CN, or OH
and Y is tri-lower alkyl ammonium, N,N-di-lower alkyl hydrazonium, di-lower alkyl ammonium-N-oxide, or N, N-di-lower alkyl-N-benzyl ammonium.

The new dyestuffs are eminently suitable for the dyeing and printing of a great variety of fibre materials, such as for the dyeing and printing of tanned cotton, of fibres of aromatic polyesters, particularly those of polyesters containing sulphonic acid groups, for example of ethylene glycol and sulphophthalic acid, of polyamide fibres, polyurethane fibres, and, preferably, polymers and copolymers of acrylonitrile or asym. dicyanoethylene; on the last-mentioned fibres, in particular, there are obtained dyeings and prints of good to excellent fastness properties, such as fastness to light, wet processing, ironing, sublimation and decatizing.

In the following examples the parts are parts by weight unless otherwise stated; the temperatures are given in degrees centigrade.

EXAMPLE 1

19.5 g. 3-amino - 5 - nitro-2,1-benzisothiazole are dissolved in about 150 ml. phosphoric acid with slight heating and, after cooling to −10°, diazotised by slowly introducing 6.9 g. of finely powdered $NaNO_2$. The reaction mixture is stirred for 1–2 hours at −5 to −10° and the excess nitrite is destroyed by means of some amidosulphonic acid. The diazonium salt solution so obtained is poured at 0° C. and with the addition of ice to a solution of 33.2 g. of the compound of the formula

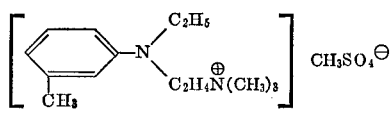

in 200 ml. of water. The partially separated dyestuff of the formula

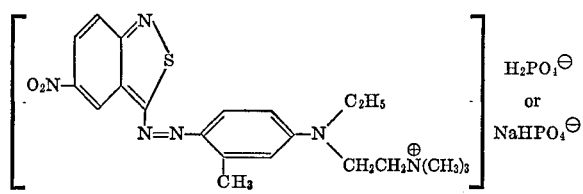

is completely precipitated in the course if about 4 hours by adding a 30% sodium acetate solution until the pH value is 3.5, filtered off with suction and washed with a 10% sodium chloride solution. It can be reprecipitated from boiling water with the addition of some active charcoal. From the dyestuff base prepared with dilute NaOH the readily soluble acetate can be obtained with acetic acid. The dyestuff dyes fibres of polyacrylonitrile in navy blue shades of good fastness properties.

In a dyebath which contains 1% of the dyestuff of the above constitution, calculated on the fibre weight, 100 g. of polyacrylonitrile fibre are dyed with the addition of 3% acetic acid (referred to the weight of the dyeing material) in a liquor ratio of 1:40. The goods are introduced at 50–60°, the bath is heated to boiling temperature within 20–30 minutes and boiled for one hour. The material is subsequently rinsed and dried.

The diazo component used in the present example was prepared in the following manner:

50 g. 5-nitro - 2 - amino-benzonitrile are dissolved in 250 ml. pyridine and 30 g. triethylamine, and hydrogen sulphide is introduced into this solution at 25–35° with occasional cooling. The solution thereby acquires a red-brown colour. After introducing for 4–5 hours, the mixture is stirred into about 2.5 litres of water, the precipitated product is filtered off with suction and redissolved from boiling water. The 5-nitro-2-amino-benzoic acid-thioamide is thus obtained with a yield of 80–85% of theory in the form of shiny reddish yellow small leaves of M.P. 165–166° (uncorrected). The reaction is simpler, when, instead of hydrogen sulphide, the calculated amount of aqueous ammonium sulphide is added drop-wise and the mixture analogously worked up.

29.3 g. of the thioamide are dissolved at 40° in 80 to 90 ml. pyridine and mixed dropwise at 30–40° with 18 ml. of 30% hydrogen peroxide. The reaction is strongly exothermic and must be carried out with cooling. Towards the end of the reaction a thick slurry of light-red crystals is separated. Stirring is continued for 4–5 hours, the crystal slurry is filtered off with suction and washed with water or methanol until free from pyridine. There are thus obtained 21.3 g. (73.5% of theory) 3-amino-5-nitro-2,1-benzisothiazole in the form of carmine-red crystals with a decomposition point lying above 230°.

By the same method the following compounds can be obtained from the correspondingly substituted o-aminobenzonitriles, for example:

3-amino-2,1-benzisothiazole,
6-chloro-3-amino-2,1-benzisothiazole,
5-nitro-7-chloro-3-amino-2,1-benzisothiazole,
5-nitro-7-bromo-3-amino-2,1-benzisothiazole,
4-methoxy-3-amino-2,1-benzisothiazole,
5,7-dibromo-3-amino-2,1-benzisothiazole.

EXAMPLE 2

19.5 g. 3-amino - 5 - nitro - 2,1 - benzisothiazole are diazotised as described in Example 1 and the diazonium salt solution is poured at 0° with the addition of ice into a solution of 27.2 g. of the compound of the formula

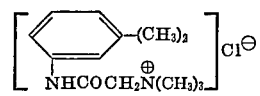

in 150 ml. of water. After coupling for 4 hours with the simultaneous dropwise addition of a 30% sodium acetate solution until the pH value is 3–4, the precipitated dyestuff of the formula

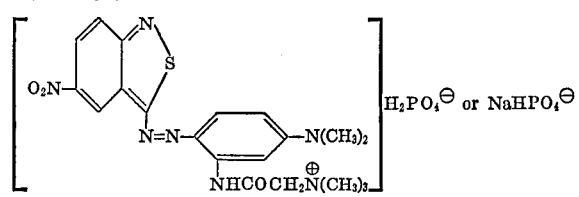

is filtered off with suction and washed with a 10% sodium chloride solution. The dyestuff dyes fibres of polyacrylonitrile in greenish blue shades of good fastness properties.

EXAMPLE 3

27 g. 3 - amino - 5 - nitro - 7 - bromo - 2,1 - benzisothiazole are dissolved in about 100 ml. of concentrated sulphuric acid by slight heating and, after cooling to −10°, diazotised with 6.9 g. of finely powdered NaNO$_2$. After stirring for two hours, the excess nitrite is destroyed with some amidosulphonic acid. The diazonium salt solution so obtained is slowly poured at 0 to −3° and with the addition of ice into a solution of 33.2 g. of the compound of the formula

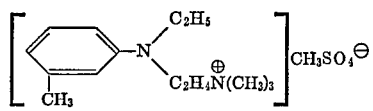

in 150 ml. of water. The coupling is completed by neutralising with a 30% sodium acetate solution until the pH value is 3, and the resultant dyestuff of the formula

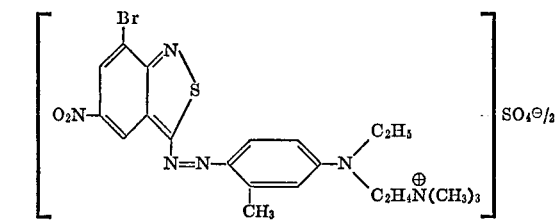

is filtered off with suction after 4 hours and washed with a 10% sodium chloride solution. The dyestuff dyes fibres of polyacrylonitrile from an acetic acid bath with good fastness properties.

EXAMPLE 4

27 g. 3 - amino - 5 - nitro - 7 - bromo - 2,1 - benzisothiazole are finely divided and pasted with 150 ml. acetic acid/propionic acid (3:1) and added to a mixture of 150 ml. acetic acid/propionic acid (3:1) and 15 ml. of nitrosyl sulphuric acid, containing 0.11 mol nitric acid, and cooled down to −5°. It is diazotised within 3 to 4 hours at 0°. Excess nitrous acid is then destroyed by the addition of somewhat solid amidosulphonic acid and the diazonium salt suspension obtained is added with stirring at 0 to 5° to an aqueous solution of 30.2 g. of the compound of the formula

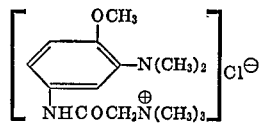

in 250 ml. of water. The mixture is buffered by the addition of a 20% sodium acetate solution until the pH is about 3.5. The resultant dyestuff of the formula

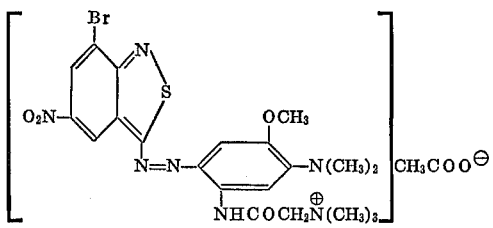

is filtered off with suction and washed with a 10% sodium chloride solution. The dyestuff dyes fibres of polyacrylonitrile bluish green shades of good fastness properties.

EXAMPLE 5

22.9 g. 3 - amino - 5 - nitro - 7 - chloro - 2,1 - benisothiazole are diazotised as described in Example 3 and the diazonium salt solution so obtained is poured at 0 to —3° and with the simultaneous addition of ice into 33.3 g. of the compound of the formula

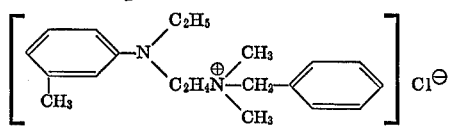

in 150 ml. of water. The coupling is completed by neutralising with a 30% sodium acetate solution until the pH value is about 3, and the resultant dyestuff of the formula

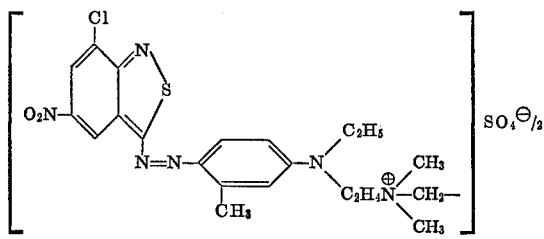

is filtered off with suction and washed with a 10% sodium chloride solution. The dyestuff dyes fibres of polyacrylonitrile from an acetic acid bath in neutral blue shades of good fastness properties.

EXAMPLE 6

18.45 g. 3-amino-6-chloro-2,1-benzisothiazole are dissolved in about 150 ml. of 85% phosphoric acid by slight heating and diazotised at —10° by slowly introducing 6.9 g. of finely powdered NaNO₂. Stirring is continued at —5 to —10° for 2 hours and the excess nitrite is destroyed with some amidosulphonic acid.

The diazonium salt solution so obtained is then poured at 0° into a solution of 31.8 g. of the compound of the formula

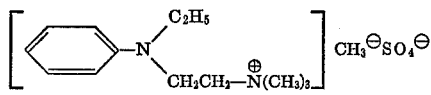

in 200 ml. of water, 150 ml. of glacial acetic acid and 600 ml. of a 30% sodium acetate solution. The dyestuff of the formula

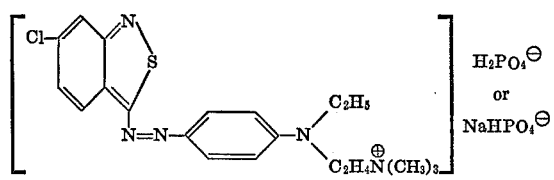

is immediately formed and precipitated. After coupling for 5 hours at a low temperature with the simultaneous addition of a 30% sodium acetate solution until the pH value is 3.5, the product is filtered off with suction and washed with a 10% sodium chloride solution. The dyestuff so obtained can be purified by recrystallisation from boiling water with the addition of some active charcoal. It dyes fibers of polyacrylonitrile in red-violet shades of good fastness properties.

EXAMPLE 7

15.0 g. 3-amino-2,1-benzisothiazole are dissolved in about 100 ml. phosphoric acid with slight heating and, after cooling to —10°, diazotised by slowly introducing 6.9 g. of finely powdered NaNO₂. After stirring at —10° for 2 hours, the excess nitrite is destroyed with some amidosulphonic acid and the diazonium salt solution so obtained is poured at 0° into a solution of 31.8 g. of the compound of the formula

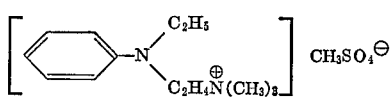

in 200 ml. of water and 500 ml. of a 30% sodium acetate solution. After coupling for 4 hours at a low temperature, the resultant dyestuff of the formula

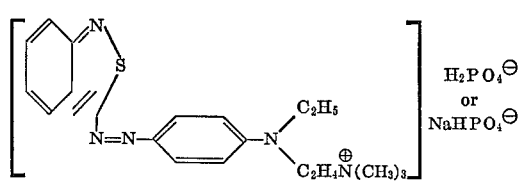

is filtered off with suction and washed with a 10% sodium chloride solution. The dyestuff can be recrystallised from boiling water with the addition of some active charcoal. It dyes fibres of polyacrylonitrile in ruby-red shades of good fastness properties.

The following dyestuffs which dye fibres of polyacrylonitrile in the stated shades can be obtained in the same way from the corresponding starting compounds:

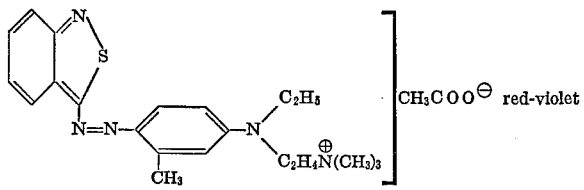

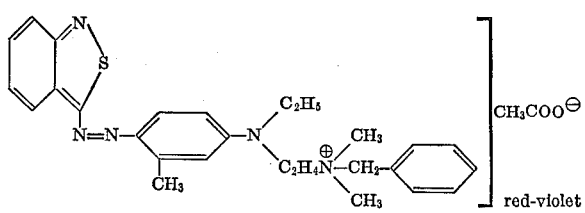

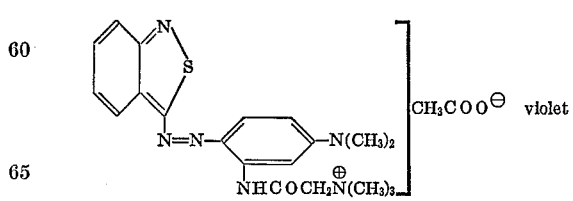

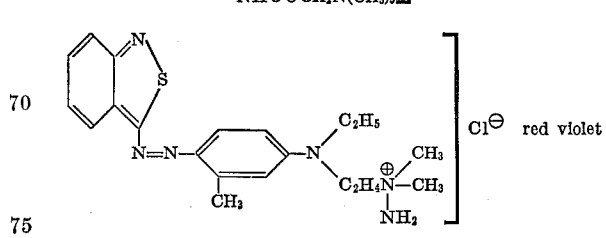

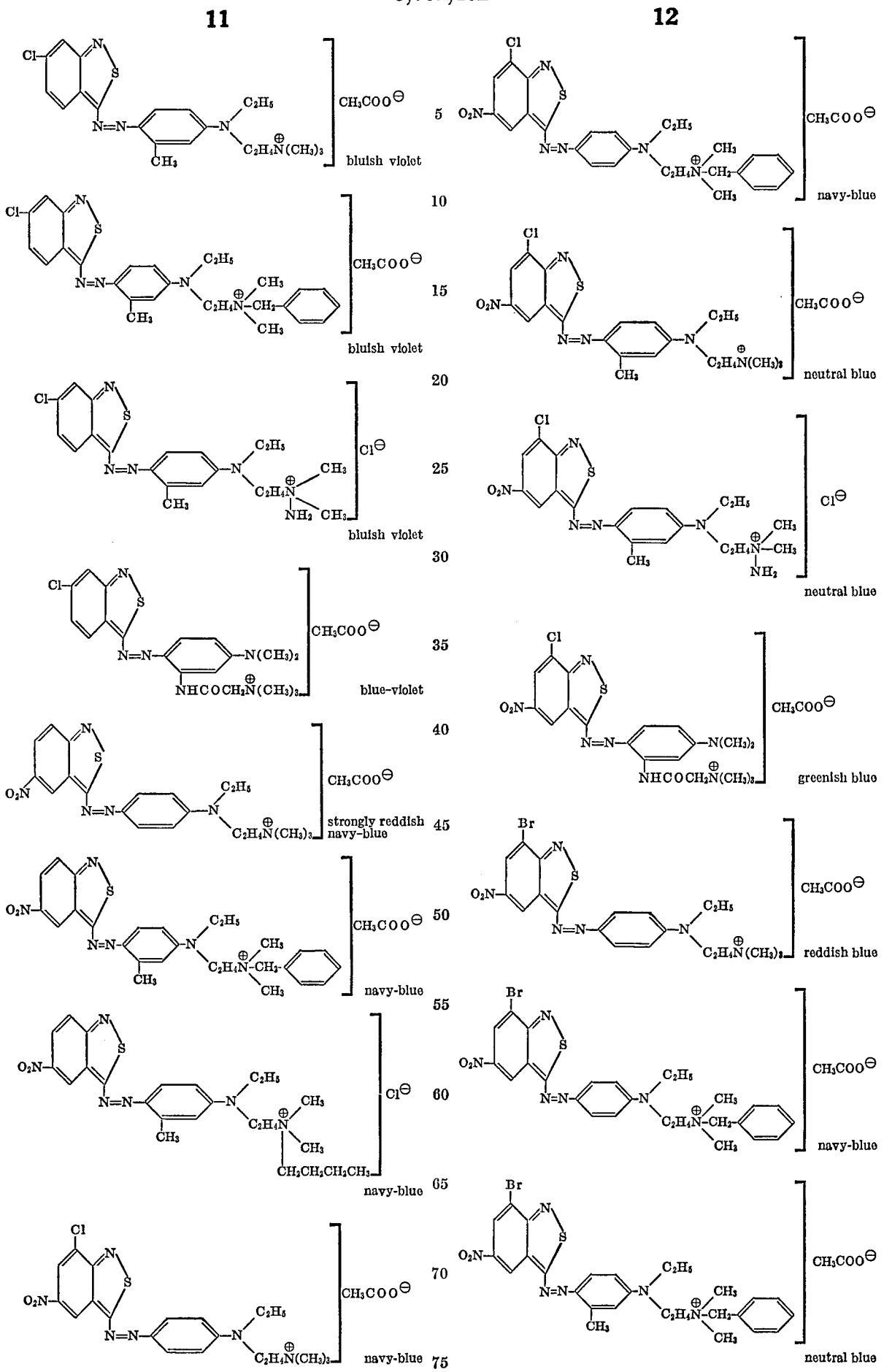

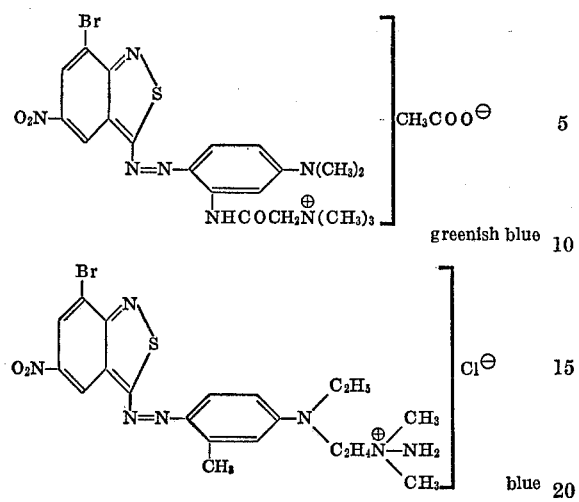

greenish blue

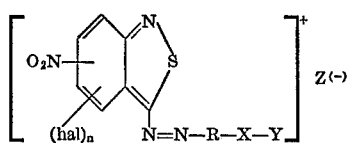

blue

What is claimed is:
1. An azo dyestuff free of sulfonic acid and carboxylic acid groups of the formula

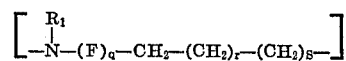

wherein hal is chlorine or bromine
n is 0 or 1
Z is an anion
R is p-phenylene; p-phenylene substituted by one or more members Cl, lower alkyl, lower alkoxy, or acylamino, wherein acyl is acetyl, propionyl or dimethylamino propionyl; di-lower alkylamino substituted o-phenylene; diphenylamino -ylene -4,4'; dilower alkylamino. lower alkoxy substituted o-phenylene;
X is the bridge member $$\left[ -\underset{R_1}{N}-(F)_q-CH_2-(CH_2)_r-(CH_2)_s- \right]$$

wherein q, r, and S are 0 or 1
F is CO or $SO_2$
$R_1$ is H, benzyl, alkyl with 1–12 carbon atoms, alkyl with 1–12 carbon atoms substituted by a member Cl, Br, CN, or OH
and Y is tri-lower alkyl ammonium, di-lower alkyl ammonium-N-oxide, or N,N-di-lower alkyl-N-benzyl ammonium.

2. A dyestuff of claim 1 of the formula

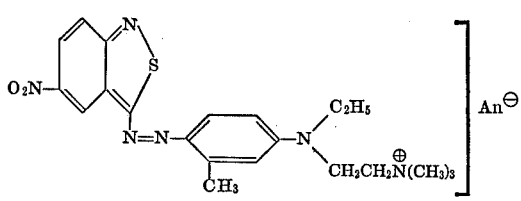

wherein An⁻ is an anion.

3. A dyestuff of claim 1 of the formula

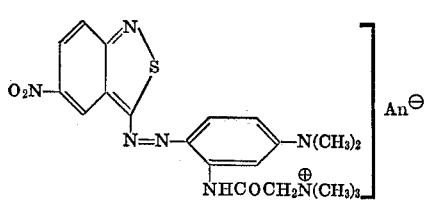

wherein An⁻ is an anion.

4. A dyestuff of claim 1 of the formula

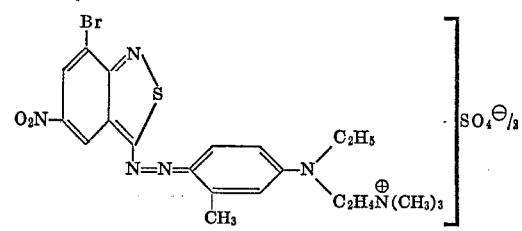

5. A dyestuff of claim 1 of the formula

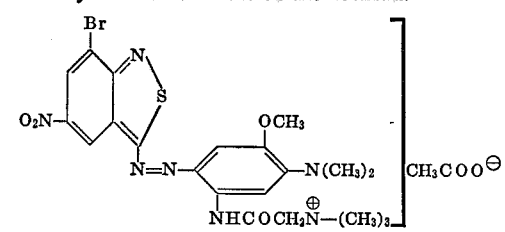

6. A dyestuff of claim 1 of the formula

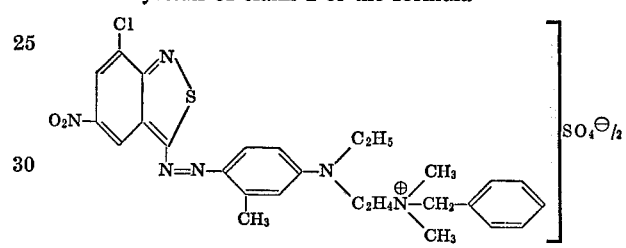

7. A dyestuff of claim 1 of the formula

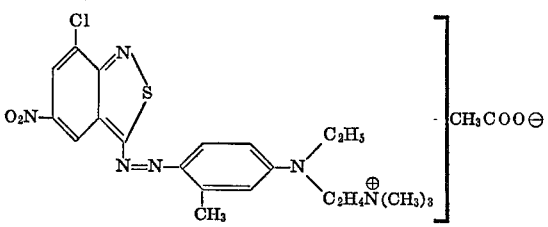

8. A dyestuff of claim 1 of the formula

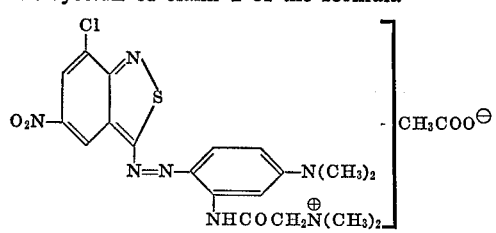

9. A dyestuff of claim 1 of the formula

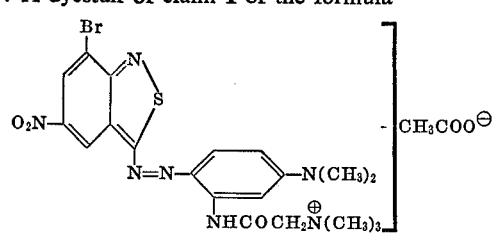

References Cited
UNITED STATES PATENTS

| | | | |
|---|---|---|---|
| 3,455,898 | 7/1969 | Seefelder et al. | 260—158 |
| 3,148,181 | 9/1964 | Wallace et al. | 260—207 |
| 3,252,965 | 5/1966 | Entschel et al. | 260—154 |

(Other references on following page)

UNITED STATES PATENTS

| | | | |
|---|---|---|---|
| 3,252,967 | 5/1966 | Entschel et al. | 260—158 |
| 2,238,485 | 4/1941 | Dickey et al. | 260—205 |
| 2,785,157 | 3/1957 | Straley et al. | 260—158 |
| 2,980,666 | 4/1961 | Merian et al. | 260—158 |
| 3,057,848 | 10/1962 | Dehn et al. | 260—158 |
| 3,119,809 | 1/1964 | Nicolaus | 260—158 |
| 3,329,669 | 7/1967 | Sartori | 260—158 |
| 3,405,118 | 10/1968 | Sartori | 260—158 |

FOREIGN PATENTS

| | | | |
|---|---|---|---|
| 887,259 | 1/1962 | Germany | 260—158 |

FLOYD DALE HIGEL, Primary Examiner

U.S. Cl. X.R.

260—302 A, 459, 465 E, 551 R, 562 B, 562 N, 567.6 M, 577, 578

UNITED STATES PATENT OFFICE
CERTIFICATE OF CORRECTION

Patent No. 3,761,462    Dated September 25, 1973

Inventor(s) Karl-Ludwig Moritz et al

It is certified that error appears in the above-identified patent and that said Letters Patent are hereby corrected as shown below:

Column 3, line 20, "ammoniumacrylamino" should read ---ammonium acylamino ---.

Column 3, line 22, "-NHSOO$_2$" should read --- -NHSO$_2$ ---.

Column 6, line 9, in the formula, "  "

should read --- 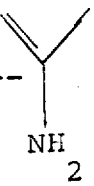 ---.

Column 8, line 7, in the formula "-(CH$_3$)$_2$" should read --- -N(CH$_3$)$_2$ ---.

Column 10, line 26, in the formula, " 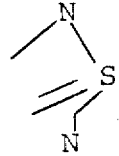 "

should read ---  ---

UNITED STATES PATENT OFFICE
CERTIFICATE OF CORRECTION

Patent No. 3,761,462　　　　　　　　Dated September 25, 1973

Inventor(s) Karl-Ludwig Moritz et al　　　　　Page - 2

It is certified that error appears in the above-identified patent and that said Letters Patent are hereby corrected as shown below:

Column 14, Claim 8, in the formula "$NHCOCH_2 \overset{+}{N}(CH_3)_2$"

should read ---$NHCOCH_2 \overset{+}{N}(CH_3)_3$---.

Signed and sealed this 18th day of February 1975.

(SEAL)
Attest:

RUTH C. MASON
Attesting Officer

C. MARSHALL DANN
Commissioner of Patents
and Trademarks